(12) United States Patent
Qin et al.

(10) Patent No.: US 10,469,319 B2
(45) Date of Patent: Nov. 5, 2019

(54) CERTIFICATION TOOL GAP ANALYZER

(71) Applicant: CA, Inc., New York, NY (US)

(72) Inventors: Zubing Robin Qin, Southborough, MA (US); Yang Yang, Newton, MA (US); Yuxiao Tracy Fang, Westford, MA (US)

(73) Assignee: CA, Inc., New York, NY (US)

( * ) Notice: Subject to any disclaimer, the term of this patent is extended or adjusted under 35 U.S.C. 154(b) by 320 days.

(21) Appl. No.: 15/444,698

(22) Filed: Feb. 28, 2017

(65) Prior Publication Data

US 2018/0248775 A1  Aug. 30, 2018

(51) Int. Cl.
 *H04L 12/24* (2006.01)

(52) U.S. Cl.
 CPC ................. *H04L 41/0866* (2013.01)

(58) Field of Classification Search
 CPC .... G06F 11/1076; G06F 16/951; G06F 3/067; G06F 11/3466; G06F 11/08; G06F 11/10; G06F 11/1004; G06F 11/1092; G06F 11/1096; G06F 16/119; G06F 16/13; G06F 16/148; G06F 16/182; G06F 16/2228; G06F 16/2246; H04L 29/12132; H04L 61/1552; H04L 67/1097
 See application file for complete search history.

(56) References Cited

U.S. PATENT DOCUMENTS

| | | | | |
|---|---|---|---|---|
| 9,247,444 B2* | 1/2016 | Drazynski | ............. | H04W 24/10 |
| 9,608,864 B2* | 3/2017 | Sanderson | .......... | H04L 41/0806 |
| 2002/0049603 A1* | 4/2002 | Mehra | .................... | G06F 9/4488 |
| | | | | 726/3 |
| 2002/0049749 A1* | 4/2002 | Helgeson | ................ | G06F 9/468 |
| | | | | 709/203 |
| 2002/0049788 A1* | 4/2002 | Lipkin | .................. | G06F 16/972 |
| | | | | 715/236 |
| 2002/0073080 A1* | 6/2002 | Lipkin | ................ | G06F 16/9535 |
| 2002/0073236 A1* | 6/2002 | Helgeson | .............. | G06F 16/258 |
| | | | | 709/246 |
| 2002/0194047 A1* | 12/2002 | Edinger | ................. | G06Q 10/06 |
| | | | | 705/7.14 |
| 2003/0229529 A1* | 12/2003 | Mui | ....................... | G06O 10/06 |
| | | | | 705/328 |
| 2008/0031197 A1* | 2/2008 | Wang | ................. | H04B 7/15542 |
| | | | | 370/331 |
| 2008/0101302 A1* | 5/2008 | Kotzin | ................. | H04B 7/2606 |
| | | | | 370/335 |

(Continued)

*Primary Examiner* — Ninos Donabed
(74) *Attorney, Agent, or Firm* — Gilliam IP PLLC (57) ABSTRACT

A tool can be designed that identifies differences or gaps in coverage between network management systems without deploying both network management systems (i.e., an already deployed network management system and a comparison network management system). This "certification gap analyzer" can analyze the coverage of the current network management system in comparison with the certification of the comparison network management system and identify gaps in coverage between devices and device components (collectively referred to hereinafter as "managed objects") certified in the different network management systems. The certification gap analyzer can present a comparison of coverage of managed objects by leveraging naming patterns of managed objects.

20 Claims, 5 Drawing Sheets

(56) References Cited

U.S. PATENT DOCUMENTS

| | | | |
|---|---|---|---|
| 2014/0295856 A1* | 10/2014 | Chou | H04W 28/24 |
| | | | 455/446 |
| 2016/0085842 A1* | 3/2016 | Cho | G06F 16/285 |
| | | | 707/737 |
| 2016/0127175 A1* | 5/2016 | Sanderson | H04L 41/0806 |
| | | | 370/252 |
| 2017/0055161 A1* | 2/2017 | Xiong | H04W 16/18 |
| 2018/0006882 A1* | 1/2018 | Sanderson | H04L 41/0806 |
| 2018/0092052 A1* | 3/2018 | Liu | H04W 24/02 |
| 2018/0121510 A1* | 5/2018 | Lurie | G06F 16/907 |

* cited by examiner

CERTIFICATION TOOL GAP ANALYZER

BACKGROUND

The disclosure generally relates to the field of data processing, and more particularly to network management data collection.

An object identifier (OID) is assigned to a managed resource, also referred to as a managed object in a management information base (MIB). A MIB for network management is a formal, hierarchal description of network objects that can be managed by a network management system that, for example, implements the Simple Network Management Protocol (SNMP). The managed object may be a device, a device attribute, a device component, etc. Based on knowledge about the managed objects defined in MIBs, an SNMP data collection configuration file, sometimes referred to as a certification file, can be defined to collect configuration and operational metrics for the managed object.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to network management systems in illustrative examples. Aspects of this disclosure can be also applied to other management systems such as telecommunications management systems. In other instances, well-known instruction instances, protocols, structures, and techniques have not been shown in detail in order not to obfuscate the description.

Introduction

For various reasons, a business organization may migrate from a network management system they are currently using to a new network management system or another version of the current network management system. Prior to migrating, an analysis may be performed to determine if there is any gap in the coverage of devices and/or various aspects of the device between the two network management systems. The various aspects of a device include device elements also known as components of a device (e.g., physical and logical interfaces) and attributes of the device (e.g., a number of interfaces, a throughput of an interface or group of interfaces, etc.). Coverage refers to the information collected by a network management system about the devices and device components within a network. A definition or configuration, referred to as a certification file or certification, specifies the information that the network management system is configured to collect. The analysis may be performed by a test deployment of the new network management system or the other version of the current network management system and generate a coverage report. The coverage report contains the coverage of the proposed network management system compared with the coverage of the current network management system to determine if there is a gap. This process is inefficient and time-consuming because the network management system may collect a vast amount of utilization data from its managed objects which may number in the tens of thousands or millions. Moreover, the current network management system may implement a different certification format from the new network management system or from the other version of the current network management system making the analysis more difficult. For example, the same performance metric may be represented as different attributes among different certification files.

Overview

A tool can be designed that identifies differences or gaps in coverage between network management systems without deploying both network management systems (i.e., an already deployed network management system and a comparison network management system). This "certification gap analyzer" can analyze the coverage of the current network management system in comparison with the certification of the comparison network management system and identify gaps in coverage between devices and device components (collectively referred to hereinafter as "managed objects") certified in the different network management systems. The certification gap analyzer can present a comparison of coverage of managed objects by leveraging naming patterns of managed objects.

The certification gap analyzer initially identifies the managed objects of a deployed network management system already discovered and managed by the deployed network management system. In addition to identifying the managed objects, the certification gap analyzer collects information about the managed objects, such as names of the managed objects and a corresponding MIB translation file (also referred to as a metric expressions file) for each of the device components. The certification gap analyzer then goes through an analysis phase. In the analysis phase, the certification gap analyzer identifies unique attributes of the managed objects. The certification gap analyzer also parses the certification files of the comparison network management system and generates a listing of certified devices with corresponding OIDs. The certification gap analyzer then correlates the OIDs of the unique attributes of the deployed network management system with the listing for the comparison network management system to determine gaps in coverage between the systems.

Example Illustrations

Figure 1:
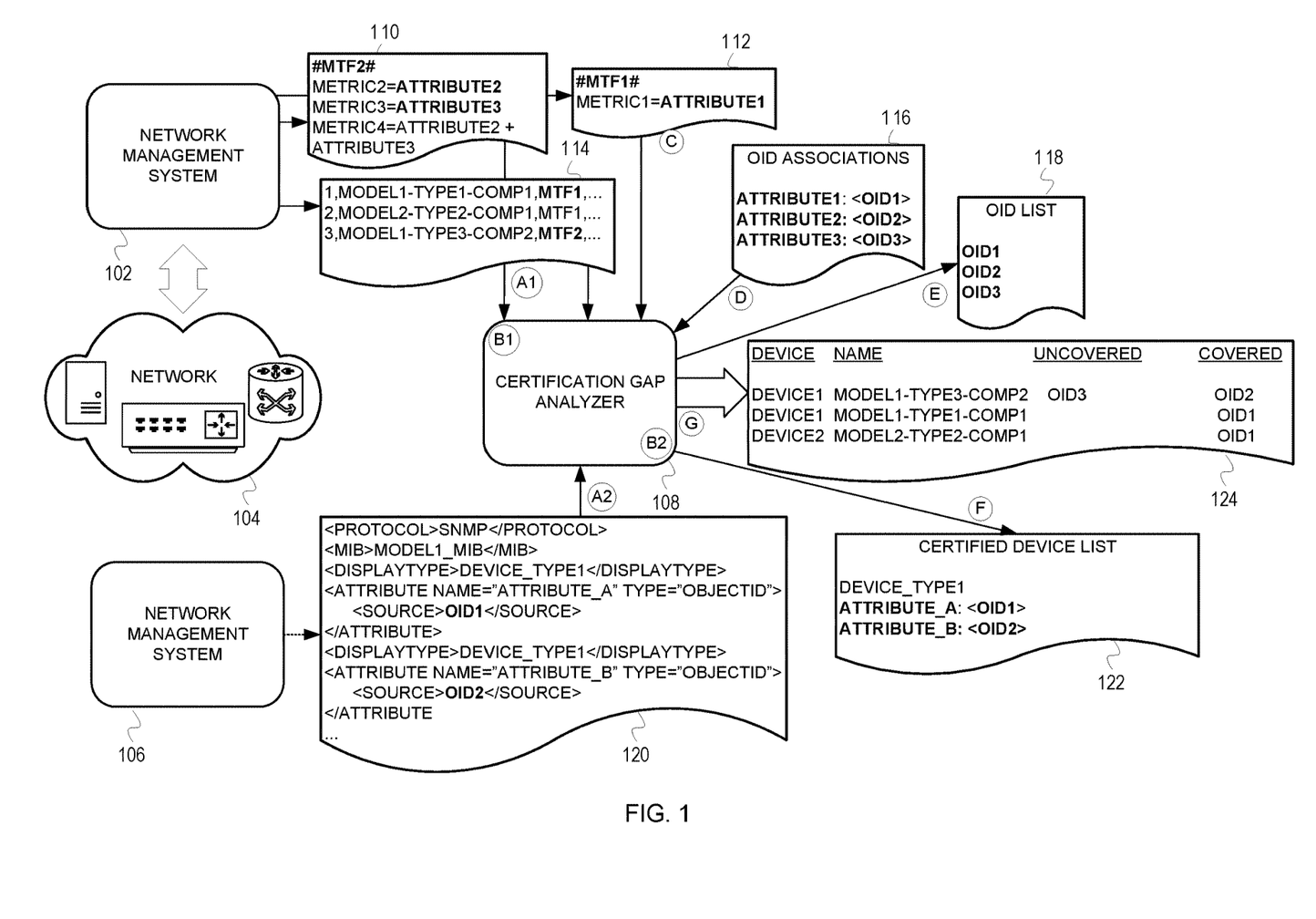
FIG. 1 depicts an example certification gap analyzer tool in accordance with some embodiments.

FIG. 1 depicts an example certification gap analyzer tool in accordance with some embodiments. A certification gap analyzer 108 (hereinafter "analyzer 108") determines the coverage gap between a network management system currently being used, a network management system 102, and a comparison or proposed network management system (e.g., a network management system 106). The network management system 102 monitors and manages networked devices (e.g., servers, routers, switches, etc.), device attributes, device components, and device component attributes referred to collectively as managed objects 104. The definition of a device component will vary with the device. For instance, the device component can include software components or hardware components such as processors of the device, interfaces of the device, an application of the device, etc. In this example, a managed objects file 114 contains information on the managed objects 104 of the network management system 102. The managed objects 104 are the devices and the device components already discovered and managed by the network management system 102. The analyzer 108 parses the managed objects file 114 and determines a metric expressions file associated with each of the device components (e.g., metric expressions files 110 and 112). The analyzer 108 determines the unique attributes indicated in the metric expressions files 110 and 112 and generates a list of unique OIDs 118 by leveraging an OID association file 116. The analyzer 108 determines the OIDs covered by the network management system 106 by comparing the OIDs in the OID list 118 with the OIDs in a certified device list 122 generated by the analyzer 108 from a certification file 120 of the network management system 106.

FIG. 1 is annotated with a series of letters A(A1-A2) and B(B1-B2)-G. These letters represent stages of operations, each of which may be one operation or multiple operations. Although these stages are ordered for this example, the stages illustrate one example to aid in understanding this disclosure and should not be used to limit the claims. Subject matter falling within the scope of the claims can vary with respect to the order and some of the operations.

Prior to stage A, the managed objects file 114 was generated after deployment of the network management system 102. The managed objects file 114 comprises information that defines the managed objects 104 such as device names, device component names, device types, descriptions, device component types, and metric expressions file identifiers associated with device components. The managed object file 114 also includes properties of the managed objects 104, such as a unique sequence identifier, device model, version number, internet protocol (IP) address, etc.

At stage A1, configuration input parameters are supplied to the analyzer 108 (e.g., using an input parameter file, graphical user interface (GUI)). The configuration input parameters comprise a directory that contains the input files (e.g., the managed objects file 114) (hereinafter "input file directory"), a version of the network management system 102, and a directory of library files (e.g., metric expressions file, OID association file) (hereinafter "library directory"). The input file directory may contain one or more managed objects files. Because the data in the input files and/or library files (e.g., the managed objects file 114, the metric expressions files 110 and 112, and the OID association file 116, etc.) may be formatted differently based on the version of the network management system 102, the analyzer 108 determines compatible functions for processing the aforementioned files based on the version of the network management system 102.

At stage B1, the analyzer 108 parses the managed objects file 114 to identify various information such as device name, type, IP address, metric expressions file name, etc. Since the information in the managed object file 114 may not follow a specific format, the analyzer 108 identifies patterns of data in the managed objects file 114 and recognizes semantic differences between the extracted information. For example, the analyzer 108 may be programmed to identify an IP address, acronyms used for names, manufacturer, device model names, and/or types of the device or device component. Examples of acronyms used for device type identifiers are: "RH" to identify router health objects, "SH" to identify system health objects, "AH" to identify application health objects, etc. Examples of acronyms for the device and/or the device component names are: BRAS for a broadband remote access server, DSLAM for a digital subscriber line access multiplexer, CPU for a central processing unit, etc. The analyzer 108 can also parse descriptions to identify a manufacturer name, model name and number, operating system version, etc. For example, a description may be: "Redback Networks SmartEdge OS Version SEOS-6.2.1" which is comprised of the manufacturer name, Redback Networks, and the model of the router, SmartEdge.

Although other techniques are possible, the analyzer 108 organizes the information to conform to a naming convention and/or rules. For example, a device component name may follow a pattern of: "device name+device type (e.g., RH)+device component type (e.g., CPU)+numerical sequence (e.g., 1)." The device name on the other hand, may follow a pattern of: "manufacturer name (e.g., RB for Redback)+device name (e.g., BRAS)+location (e.g., JAX for Jacksonville). Therefore, an example of device name would be rb-bras-jax and a device component name would be rb-bras-jax-RH-CPU-1. If there is another CPU for the device, the second CPU would be identified as rb-bras-jax-RH-CPU-2. The naming convention may be used to group devices and/or device components for analysis or reporting. Other information associated with the device component may also be used with the naming convention in the analysis or other processes such as filtering, summarizing, etc.

After identifying the metric expressions files at stage B 1, the analyzer 108 processes the identified metric expressions files 110 and 112 to extract unique attributes at stage C. The metric expressions files 110 and 112 include information such as the name of a MIB file and version, the name of the device component type, etc. The metric expressions files 110 and 112 also contain expressions for computing values for various management metrics based on the collected attribute values. These expressions are referred to herein as "metric expressions." A metric expression may also compute a metric value with a variable attribute value. An attribute uniquely identifies a property of a device or device component (e.g., idle time, memory utilization, etc.). The illustration depicts the metric expressions files 110 and 112 with metric expressions with assigned variable attribute values. For instance, in the metric expressions file 112, "ATTRIBUTE1" is assigned to the metric expression "METRIC1." In the metric expressions file 110, "ATTRIBUTE2" is assigned to the metric expression "METRIC2," "ATTRIBUTE3" is assigned to metric expression "METRIC3," and "ATTRIBUTE2+ATTRIBUTE3" is assigned to metric expression "METRIC4." In this instance, the analyzer 108 determines that the unique attributes are ATTRIBUTE1 from the metric expressions file 112 and the attributes ATTRIBUTE2 and ATTRIBUTE3 from the metric expressions file 110.

At stage D, the analyzer 108 parses the OID associations file 116 to extract the unique OIDs based on the determined unique attributes in stage C. The OID associations file 116 also referred to as an attribute-OID association file contains a list of attributes with its associated OIDs. The analyzer 108 identifies the associated OID of each of the unique attributes. In this example, the identified unique OIDs are OID1, OID2, and OID3. Although FIG. 1 depicts the metric expressions and the list of attributes with its associated OIDs in separate files, this is not necessary. Both the metric expressions and the attribute list may be contained in one file.

At stage E, the analyzer 108 generates the OID list 118 which contains a list of the unique OIDs identified in stage D. The unique OIDs in the OID list 118 may be arranged in a sequence. The list of unique OIDs may be temporarily stored in a buffer, file, data structure, etc.

At stage A2, the configuration input parameters for the network management system 106 are supplied to the analyzer 108 (e.g., GUI, using an input parameter file). The configuration input parameters comprise a directory that contains the certification files (e.g., the certification file 120) (hereinafter "certification file directory"), and, if applicable, a version of the network management system 106. The input file directory may contain one or more certification files. Because the certification files may be formatted differently (e.g., extensible markup language (XML), comma separated values (CSV)) the analyzer 108 uses the version of the network management system 106 to determine compatible functions for processing the certification file(s).

At stage B2, the analyzer 108 parses the certification file 120 to identify various information such as device model, device type MIB name, attribute name, OID, etc. The certification file 120, also referred to as a data collection configuration file contains information on devices and device components certified by the network management system 106. This information may be based on attributes of the managed objects defined in MIBs. The analyzer 108 extracts the device types, the attributes and corresponding OIDs associated with the device name. For example, the analyzer 108 determines that the DEVICE_TYPE1 has two attributes to be collected, ATTRIBUTE_A and ATTRIBUTE_B. In addition, the analyzer 108 determines that ATTRIBUTE_A is mapped to OID1 and ATTRIBUTE_B is mapped to OID2.

At stage F, the analyzer 108 generates the certified device list 122 based on the extracted information in stage B2. The list of certified devices with the attributes and OIDs may be temporarily stored in a buffer, file, data structure, etc. The list may be arranged according to the device type as depicted in FIG. 1.

At stage G, the analyzer 108 determines if the OIDs in the OID list 118 have corresponding OIDs in the certified device list 122. If there is an overlap of the corresponding OID in the certified device list 122, then the OID is covered. If there is no overlap of the corresponding OID in the certified device list 122, then the OID is not covered. The analyzer 108 may use a coverage flag to identify if an OID in the OID list 118 is covered or not. For example, if the OID is covered, then the coverage flag is set to 1. If the OID is not covered, then the coverage flag is set to 0. The analyzer 108 then generates a coverage report 124 based on the determined coverage of the OIDs in the OID list 118. As depicted, the coverage report 124 identifies the covered metric expressions per device component.

Figure 2A:
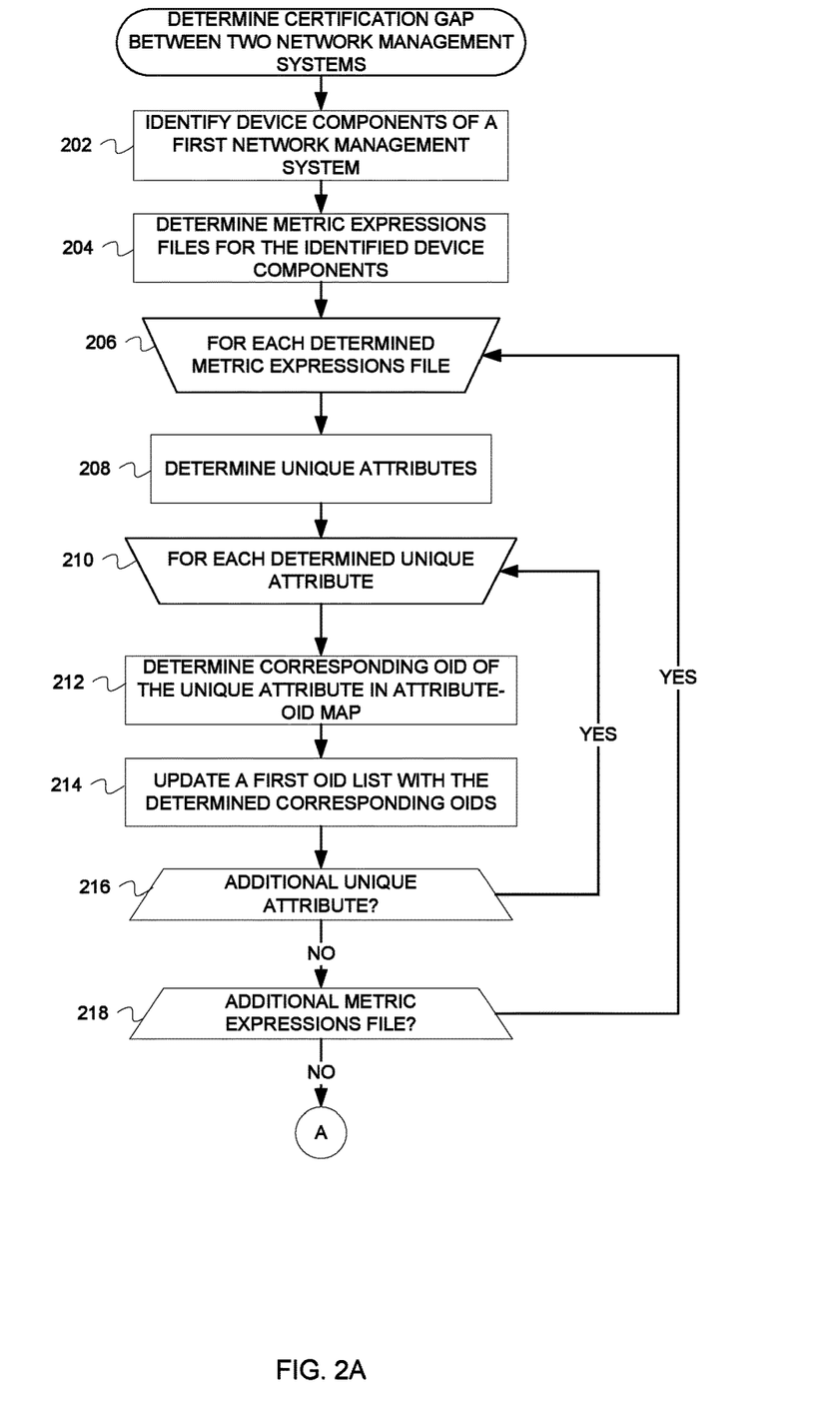
FIG. 2A and FIG. 2B are flowcharts of example operations for determining a certification gap between two network management systems.
Figure 2B:
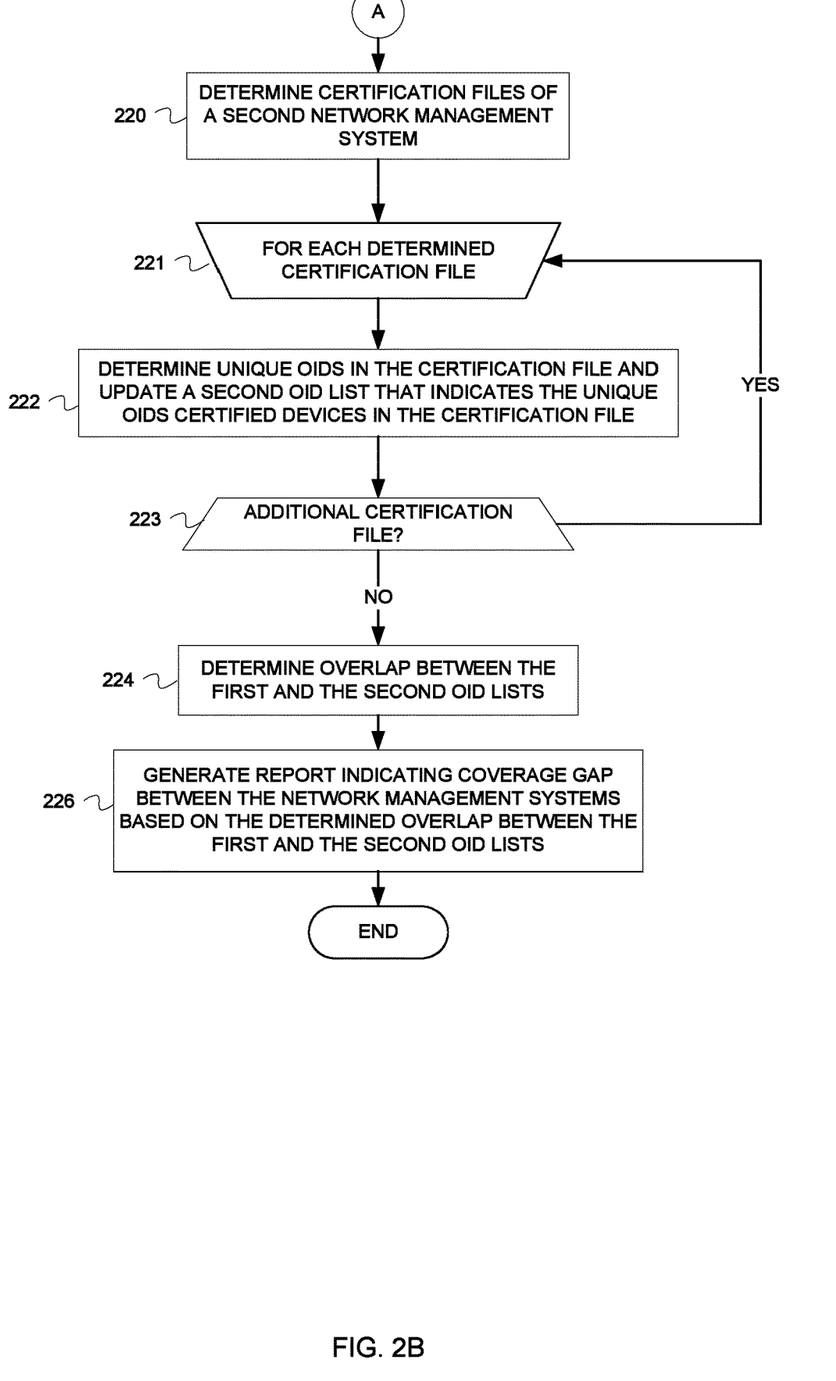

FIGS. 2A-2B depict a flowchart of example operations for determining certification gap between two network management systems. The description for FIGS. 2A-2B refers to a certification gap analyzer as performing the example operations for consistency with FIG. 1.

Prior to the operations in FIGS. 2A-2B, a set of managed objects may have already been discovered and/or currently managed by a first network management system. The discovery of the managed objects may be performed by various means such as through network discovery, database query, etc. The information resulting from the discovery of these managed objects are put into a managed objects file. This information includes the definitions of the managed objects, properties of the managed objects, and a metric expressions file associated with the device components.

The certification gap analyzer identifies device components of a first network management system from the managed objects file (202). The certification gap analyzer may receive the managed objects file through a GUI, in a message (e.g., inter-process communication message), via a buffer, as arguments in a function/method invocation, etc.

The certification gap analyzer may use a device component identifier to identify the device components in the managed objects file. The certification gap analyzer may also be configured to use a specific property value of a device component such as an identifier for each device component, e.g., an IP address, a device component name, etc. The certification gap analyzer may also use a combination of properties or information to uniquely identify a device component, such as a combination of a device name and a device component name. The certification gap analyzer updates a device component list with each identified device component. If there is no device component list, the certification gap analyzer creates a device component list before adding the identified device component into the device component list. The device components list may be temporarily stored in a buffer, file, data structure, etc.

After identifying the device components, the configuration gap analyzer determines metric expressions files for the identified device components (204). A metric expressions file may be associated with a device component by the metric expressions file name, metric expressions file identifier, etc. A metric expressions file defines a set of metric expressions. As stated earlier, metric expressions are expressions for computing values for various management metrics based on the collected attribute values. A metric expression may compute a metric value with a variable attribute value. The metric expressions file also contains other information for processing the metric expressions contained in the file, such as the attribute-OID association file also referred to as an attribute-OID map (e.g., an MIB file name that contains the OIDs for the attributes defined in the metric expressions file), a version of the metric expressions file and/or the attribute-OID association file, a name of an agent that polls the attribute variable values, information about the device component (e.g., device component type, description, etc.), information about the attribute variable values (e.g., attribute type, data type that will contain the attribute variable value, etc.)

If the managed objects file contains the metric expressions file identifiers instead of metric expressions file names, the certification gap analyzer then creates and submits a query to a data repository that contains the names of the metric expressions files. The certification gap analyzer may also determine the metric expressions files by detecting file names with a specific suffix, for example, "mtf." A metric expressions file may have a 1:1 or 1:n relationship with a device component. The certification gap analyzer generates a map that indicates the device component and its associated metric expressions file. The device components map may be generated from the device components list generated in block 202. In another instance, the certification gap analyzer may generate a list of the determined metric expressions files.

After determining the metric expressions files, the certification gap analyzer begins processing each determined metric expressions file (206). The metric expressions file currently being processed by the certification gap analyzer is hereinafter referred to as the "selected metric expressions file." The certification gap analyzer evaluates the selected metric expressions file, evaluating each metric expression in order. The selected metric expressions file contains at least one metric expression. As stated earlier, a metric expression may compute a metric value with at least one variable attribute value. For instance, a metric expression may compute average idle time for the busiest processor of the routers in the managed network. To compute the metric expressions, the network management system will first collect the values of the attribute "idle time" of these busiest processors.

The certification gap analyzer evaluates the selected metric expressions file and determines globally unique attributes associated with the metric expressions in the selected metric expressions file (208). "Globally unique" refers to the attributes being unique across the metric expressions files. The certification gap analyzer creates a multimap of the metric expressions, containing the association of the metric expression to at least one unique attribute. The certification gap analyzer can create a list of the metric expressions and/or the determined unique attributes in the selected metric expressions file. In an example, the certification gap analyzer traverses over each metric expression and populates the list of unique attributes when the attribute is first encountered. In another example, the certification gap analyzer utilizes regular expressions in determining unique attributes. The process of determining the unique attributes can vary based on the metric expressions contained in the metric expressions file.

As unique attributes are determined, the certification gap analyzer processes the determined unique attribute (210). The unique attribute currently being processed by the certification gap analyzer is hereinafter referred to as the "selected attribute." To process each selected attribute, the certification gap analyzer determines the corresponding OID of the selected attribute (212). The corresponding OID of the selected attribute can be determined from an attribute-OID associations file (e.g., a precompiled MIB file) also referred to as an attributes list. The attributes list assigns attribute variables to the OIDs. For instance, as depicted in FIG. 1, ATTRIBUTE1 is assigned to OID1. For example, the certification gap analyzer traverses the attributes list and determines the corresponding or assigned OID of the selected attribute.

The certification gap analyzer updates a first OID list with the determined corresponding OID of the selected attribute (214). The certification gap analyzer updates a first OID list by adding the determined corresponding OID to the first OID list. If the first OID list does not exist, the certification gap analyzer creates the first OID list and then adds the corresponding OID.

The certification gap analyzer determines if there is an additional unique attribute to be processed (216). A metric expressions file may indicate multiple globally unique attributes. If there is an additional unique attribute to be processed, then the next unique attribute is selected (210). If there is no additional unique attribute to be processed, then the certification gap analyzer determines if there is an additional metric expressions file to be processed (218). If there is an additional metric expressions file to be processed, then the next metric expressions file is selected (206).

If there is no additional metric expressions file to be processed, then the certification gap analyzer determines the certification files associated with the second network management system (220). The certification files may be in a location specified in a GUI, in a message (e.g., inter-process communication message), a buffer, arguments in a function/method invocation, etc. The certification files (e.g., an SNMP data collection configuration file) are defined to collect attribute values of devices and device components certified by the second or proposed network management system. Although other techniques are possible, the certification files may specify a device type or a device component type and/or address (e.g., IP address) before each group of attribute values to be collected. Other device or device component addresses can be specified in the certification files. The certification files can also be defined per device address or device component address. In addition, devices or device components for data collection may be identified by a device or device component identifier that resolves to a device or device component profile that comprises information for establishing a session with the device or the device component (e.g., environment variables) for data collection.

After determining the certification files, the certification gap analyzer begins processing each determined certification file (221). The certification file currently being processed by the certification gap analyzer is hereinafter referred to as the "selected certification file." The certification gap analyzer evaluates the device types and/or device component type in the certification file, evaluating each device type and/or device component type in order. The selected certification file contains at least one device type and/or device component type.

The certification gap analyzer determines unique OIDs in the selected certification file and updates a second OID list that indicates the unique OIDs of the certification file (222). If there is no second OID list to be updated, the certification gap analyzer generates the second OID list. The certification gap analyzer traverses the certification file and extracts the unique OIDs and corresponding attribute of each device type and/or device component type. For example, the certification gap analyzer traverses each device type and/or device component type and populates the second list of unique OIDs with its corresponding attribute when first encountered. The second OID list may be grouped according to a device type or device component type. As stated earlier, there could be multiple certification files associated with the second network management system. If there are multiple certification files, the certification gap analyzer reads each certification file and determines the unique OIDs in each of the certification files.

The certification gap analyzer determines if there is an additional certification file to be processed (223). If there is an additional certification file to be processed, then the next certification file is selected (221). If there is no additional certification file to be processed, then the certification gap analyzer determines an overlap between the first and the second OID lists (224). If an OID is in the first and the second OID lists, then the OID is covered. For example, the certification gap analyzer traverses each OID in the first OID list. For each OID in the first OID list, the certification gap analyzer traverses each OID in the second OID list to determine if there is a match. If a match is found, the certification gap analyzer sets a flag, marker or another type of indicator to denote that there is a match. For instance, the certification gap analyzer sets a coverage flag for an OID to true if the match is found. In another example, the indicator may be in another data structure such as a map with the OID as a key.

After determining the overlap between the first and the second OID lists, then the certificate gap analyzer generates a report indicating a coverage gap between the network management systems based on the determined overlap between the first and the second OID lists (226). The coverage report 124 may present coverage data in various formats. The analyzer 108 may also generate more than one type of coverage report. For example, the coverage report 124 may show covered, partially covered, and uncovered OIDs, metric expressions, metric expressions files, devices, device components, etc. Another example of a report is a summary report, which shows the percentage of coverage of each device. The coverage report is typically presented in a table or chart. The coverage report may also be in various formats an HTML file, CSV file, spreadsheet, etc.

Figure 3:
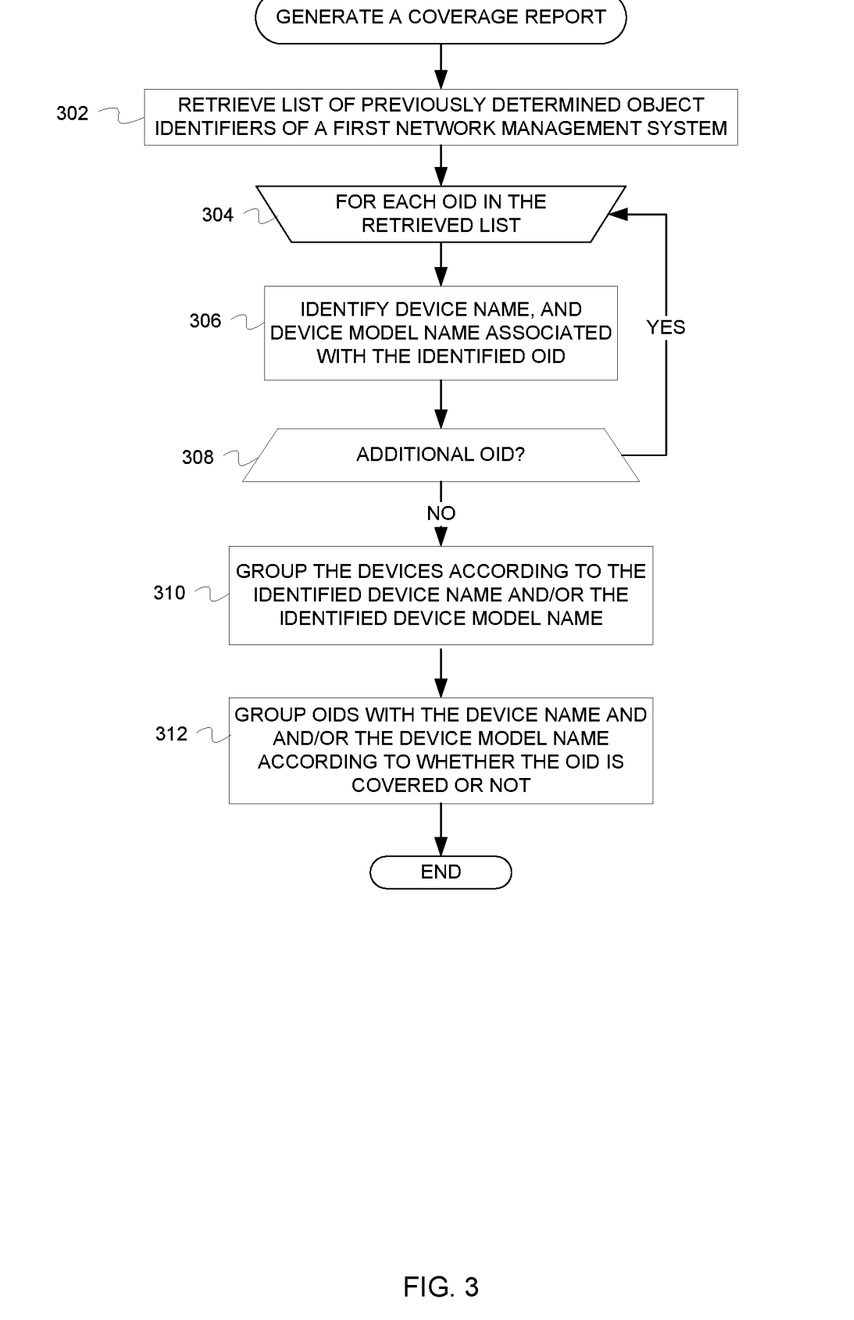
FIG. 3 is a flowchart of example operations for generating a certification gap report between two network management systems.

FIG. 3 is a flowchart of example operations for generating a coverage gap report between two network management systems. The description in FIG. 3 refers to a certification gap analyzer as performing the example operations for consistency with FIG. 1.

The certification gap analyzer retrieves a list of previously determined OIDs of a first network management system (302). These OIDs correspond to the devices already discovered by the deployed or established network management system, which is the first network management system. The list can be the first OID list that was generated in block 214 of FIG. 2A. The certification gap analyzer begins processing each OID in the retrieved list (304). The OID currently being processed by the certification gap analyzer is hereinafter referred to as the "selected OID."

The certification gap analyzer identifies the device name and device model name associated with the selected OID (306). The certification gap analyzer may identify the device associated with the OID using a device component identifier associated with the OID. The certification gap analyzer tracked the device component identifiers associated with the metric expressions, attributes, and OIDs while performing the operations in FIGS. 2A and 2B. The certification gap analyzer may use various techniques in keeping track of the association such as creating a reference to the metric expressions, the attributes, and the OIDs. The certification gap analyzer may also keep track of the association with the OIDs to the device component identifiers through the first OID list. For example, in the first OID list, each OID may be assigned to the associated device component identifier. The certification gap analyzer then identifies the device name and device model name using the associated device component identifier. The certification gap analyzer may first determine the device component name and device model name using the managed objects file. Since the device component name comprises the device name, the certification gap analyzer can parse the device component name to determine the device name. As stated earlier, the managed objects file also contains the device model name and other information relative to the device component and/or device.

The certification gap analyzer determines if there is an additional OID to be processed (308). If there is an additional OID to be processed, then the next OID is selected (304). If there is no additional OID to be processed, then the certification gap analyzer groups the devices according to the identified device name and/or the identified device model name (310). For example, the identified device names may be grouped alphabetically. The identified device model names may also be grouped alphabetically within the grouped device name. The certification gap analyzer keeps track of the OIDs associated with the identified device name and the identified device model name.

The certification gap analyzer groups the OIDs associated with the identified device name and the identified device model name according to whether the OID is covered or not (312). For example, if there are two OIDs associated with the identified device name, the two OIDs are further grouped based on whether the OID is covered or not. The certification gap analyzer may get the value of a coverage flag for the OID to determine if the OID is covered or not. As stated earlier, the value of the coverage flag may be set to true if the OID is covered. The certification gap analyzer may then determine the percentage of coverage of the identified device name. For example, if all the OIDs associated with the identified device name are covered, then the identified device name is 100% covered. If half of the OIDs associated with the identified device name are covered, then the identified device name is partially covered or 50% covered. If none of the OIDs associated with the identified device name are covered, then the identified device name is uncovered. The determined information may then be displayed in a coverage report and/or generated in a spreadsheet.

The coverage report disclosed showed the coverage report of the OIDs per the device name and the device model name. The coverage report may also show coverage per device components, metric expressions, etc. The coverage report may also show information in various levels of detail such as a summary coverage report, detailed coverage report, etc. For example, the summary coverage report may show percentage of coverage per device component, device component-OID map, metric expressions, attributes, etc. The detailed coverage report in addition to showing the percentage of coverage, may also show the number of attributes or OIDs covered per device component or metric expressions file, etc.

A determination on what type of coverage report may be made. For example, an administrator can configure the contents of the coverage report(s), whether the coverage report is displayed using a tabular format, spreadsheet, etc. In another example, a configuration file can be used to determine the type and contents of coverage report to be generated and/or displayed.

Variations

The above examples refer to an analyzer performing the functions described in this disclosure, such as determining device component information from a managed objects file, determining unique attributes, mapping the unique attributes with OIDs, etc. These functions can be customized and implemented using various means. For example, these functions can be customized based on the information contained in the managed objects file or the metric expressions file. In another example, the functions can be implemented externally via a plug-in, a script file(s), etc. The analyzer then calls the appropriate plug-in or script file(s).

The above examples refer to determining coverage gap of SNMP-compliant devices. The coverage gap analyzer may also determine coverage gaps of non-SNMP compliant devices and devices that are SNMP compliant but also have data for components and/or operational aspects that are not collected according to the SNMP protocol ("hybrid devices").

The above examples refer to a managed objects file that uses delimiter-separated values (DSV) files, wherein the information that defines the device components or the device component properties are separated with a specific delimiter character. The managed objects file may also follow other formats such as using field placement to identify the type of information or property of the device component. For example, the first field of the managed object file is the device component identifier, the second field a device component name, the third field a device component address, etc. The certification gap analyzer uses the field placement when parsing the data contained in the managed objects file to identify the information contained in the field.

The above examples refer to the use of files such as a managed objects file, a certification file, a metric expressions file, etc. in determining a coverage gap between two network management systems. In other embodiments, the information used in determining the coverage gap may be retrieved from one or more data repositories such as a database.

The examples often refer to an "analyzer." The analyzer is a construct used to refer to an implementation of functionality for determining the coverage gap between two network management systems. This construct is utilized since numerous implementations are possible. The term is used to efficiently explain the content of the disclosure. The analyzer can also be referred to as a module. Although the examples refer to operations being performed by an analyzer, different entities can perform different operations. For instance, a dedicated co-processor or application specific integrated circuit can determine coverage gap.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. With respect to FIG. 3, a block 314 is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device that employs any one of or a combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
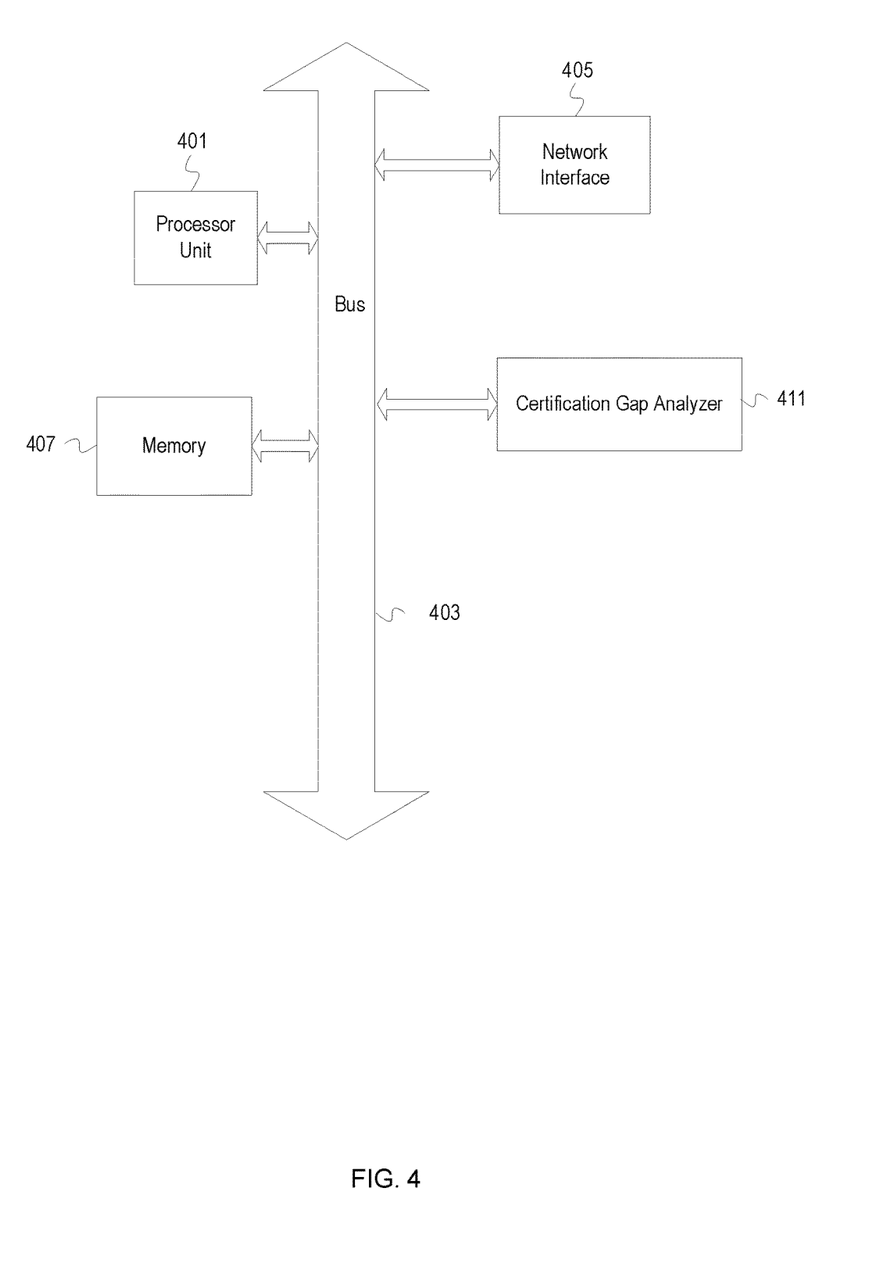
FIG. 4 depicts an example computer system with a certification gap analyzer.

FIG. 4 depicts an example computer system with a certification gap analyzer. The computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, Hyper-Transport® bus, InfiniBand® bus, NuBus, etc.) and a network interface 405 (e.g., a Fiber Channel interface, an Ethernet interface, an internet small computer system interface, SONET interface, wireless interface, etc.). The system also includes the certification gap analyzer 411. The certification gap analyzer 411 determines the certification gap between a current network management system and a proposed network management system. Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for determining coverage gaps between two network management systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

TERMINOLOGY

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    identifying managed devices of a network for a first network management system and collecting information about the managed devices, wherein the information about the managed devices comprises information about components of the managed devices;
    determining unique attributes across the components of the managed devices, wherein the unique attributes are unique relative to attributes of the components of the managed devices;
    determining a first plurality of object identifiers that correspond to the determined unique attributes of the managed device components;
    accessing a set of one or more certification files of a second network management system to determine a second plurality of object identifiers;
    determining overlap between the first plurality of object identifiers and the second plurality of object identifiers; and
    generating a report indicating a coverage gap between the first and second network management systems based, at least in part, on the determined overlap.

2. The method of claim 1, wherein determining the unique attributes comprises accessing, for each component of each of the managed devices, a file comprising metric expressions to determine a set of one or more attributes of the device component.

3. The method of claim 2, wherein the metric expressions comprise at least one attribute.

4. The method of claim 1, wherein identifying managed devices is based, at least in part, on a managed device naming convention.

5. The method of claim 1, wherein determining a first plurality of object identifiers that corresponds to the unique attributes comprises using a mapping of a first object identifier to a first unique attribute.

6. The method of claim 1 further comprising:
    setting variables to indicate the determined overlap between the first plurality of object identifiers and the second plurality of object identifiers.

7. The method of claim 1 further comprising:
    determining managed device names based, at least in part, on the first plurality of object identifiers, wherein determining the managed device names comprises identifying names of the components of the managed devices associated with the first plurality of object identifiers and parsing the identified names of the components.

8. The method of claim 7 further comprising:
    grouping the managed devices based, at least in part, on the managed device names.

9. One or more non-transitory machine-readable media comprising program code for certification gap analysis, the program code to:
    identify managed devices of a network for a first network management system and collect information about the managed devices, wherein the information about the managed devices comprises information about components of the managed devices;
    determine unique attributes across the components of the managed devices, wherein the unique attributes are unique relative to attributes of the components of the managed devices;
    determine a first plurality of object identifiers that correspond to the determined unique attributes of the managed device components;
    access a set of one or more certification files of a second network management system to determine a second plurality of object identifiers;
    determine an overlap between the first plurality of object identifiers and the second plurality of object identifiers; and
    generate a report indicating a coverage gap between the first and second network management systems based, at least in part, on the determined overlap.

10. The machine-readable media of claim 9, wherein the program code to determine the unique attributes comprises program code to access, for each component of each of the managed devices, a file comprising metric expressions to determine a set of one or more attributes of the device component.

11. The machine-readable media of claim 10, wherein the metric expressions comprise at least one attribute.

12. The machine-readable media of claim 9, wherein the program code to identify managed devices is based, at least in part, on a managed device naming convention.

13. The machine-readable media of claim 9, wherein the program code to determine a first plurality of object identifiers that corresponds to the unique attributes comprises program code to use a mapping of a first object identifier to a first unique attribute.

14. The machine-readable media of claim 9, wherein the program code further comprises program code to determine managed device names based, at least in part, on the first plurality of object identifiers, wherein the program code to determine the managed device names comprises program code to identify names of the components of the managed devices associated with the first plurality of object identifiers and parse the identified names of the components.

15. An apparatus comprising:
    a processor; and
    a machine-readable medium having program code executable by the processor to cause the apparatus to,
        identify managed devices of a network for a first network management system and collect information about the managed devices, wherein the information about the managed devices comprises information about components of the managed devices;

determine unique attributes across the components of the managed devices, wherein the unique attributes are unique relative to attributes of the components of the managed devices;

determine a first plurality of object identifiers that correspond to the determined unique attributes of the managed device components;

access a set of one or more certification files of a second network management system to determine a second plurality of object identifiers;

determine an overlap between the first plurality of object identifiers and the second plurality of object identifiers; and generate a report indicating a coverage gap between the first and second network management systems based, at least in part, on the determined overlap.

16. The apparatus of claim 15, wherein the program code executable by the processor to cause the apparatus to determine the unique attributes comprises program code executable by the processor to cause the apparatus to access, for each component of each of the managed devices, a file comprising metric expressions to determine a set of one or more attributes of the device component.

17. The apparatus of claim 16, wherein the metric expressions comprise at least one attribute.

18. The apparatus of claim 15, wherein the program code executable by the processor to cause the apparatus to determine a first plurality of object identifiers that corresponds to the unique attributes comprises program code executable by the processor to cause the apparatus to use a mapping of a first object identifier to a first unique attribute.

19. The apparatus of claim 15, further comprising program code executable by the processor to cause the apparatus to determine managed device names based, at least in part, on the determined first plurality of object identifiers, wherein the program code executable by the processor to cause the apparatus to determine the managed device names comprises program code executable by the processor to cause the apparatus to identify names of the components of the managed devices associated with the first plurality of object identifiers and parse the identified names of the components.

20. The apparatus of claim 19, further comprising program code executable by the processor to cause the apparatus to group the managed devices based, at least in part, on the determined managed device names.

* * * * *